(12) United States Patent
Aso

(10) Patent No.: US 8,382,454 B2
(45) Date of Patent: Feb. 26, 2013

(54) CHECK VALVE, INFUSION DEVICE USING THE SAME, AND METHOD OF MANUFACTURING THE SAME

(75) Inventor: Yoshiaki Aso, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 1177 days.

(21) Appl. No.: 12/245,023

(22) Filed: Oct. 3, 2008

(65) Prior Publication Data
US 2009/0104083 A1    Apr. 23, 2009

(30) Foreign Application Priority Data

Oct. 23, 2007  (JP) ................................. 2007-274917

(51) Int. Cl.
*F04B 49/03*   (2006.01)
(52) U.S. Cl. .................... 417/415; 137/533.11; 422/400
(58) Field of Classification Search .................. 417/415; 137/533.11; 422/400
See application file for complete search history.

(56) References Cited

U.S. PATENT DOCUMENTS

| 4,142,645 A * | 3/1979 | Walton .......................... 215/260 |
| 4,862,907 A | 9/1989 | Ledtje et al. |
| 2005/0214139 A1 * | 9/2005 | Aso ............................... 417/415 |

FOREIGN PATENT DOCUMENTS

| JP | 05-005470 | 1/1993 |
| JP | 07-145871 | 6/1995 |
| JP | 10-9151 | 1/1998 |
| JP | 2007-56989 | 3/2007 |

OTHER PUBLICATIONS

Japanese Examination Report of Japanese Application No. 2007-274917, dated Jun. 7, 2011.
Chinese First Examination Report of China Patent Application No. 200810161416.6, dated Mar. 9, 2010.

* cited by examiner

*Primary Examiner* — Charles Freay
*Assistant Examiner* — Patrick Hamo
(74) *Attorney, Agent, or Firm* — J.C. Patents

(57) ABSTRACT

A check valve capable of improving the tightness between a sphere and a valve seat and suppressing the sinking is provided, so as to provide a liquid chromatography infusion pump enabling a high precision infusion even if in a low flow rate region. On a surface, contacted with the sphere, on the valve seat 10 of the check valve, a rim 10r is disposed around a through hole 10h in the center of the valve seat 10. The rim 10r is formed as a boundary between a concave spherical surface of a diameter $\Phi 1$ and a concave spherical surface of a diameter $\Phi 2$ disposed as concentric circles with the through hole 10h. When the sphere of a diameter $\Phi B$ abuts against the valve seat 10, the sphere 15 abuts against the valve seat 10 at the annular rim 10r in a line contact according to a relation of $\Phi 1 > \Phi B > \Phi 2$.

4 Claims, 5 Drawing Sheets

CHECK VALVE, INFUSION DEVICE USING THE SAME, AND METHOD OF MANUFACTURING THE SAME

CROSS-REFERENCE TO RELATED APPLICATION

This application claims the priority benefit of Japanese application serial no. 2007-274917, filed Oct. 23, 2007. The entirety of the above-mentioned patent application is hereby incorporated by reference herein and made a part of this specification.

BACKGROUND OF THE INVENTION

1. Field of the Invention

The present invention generally relates to an infusion device for performing an infusion by repeatedly sucking/ejecting a liquid, in particular, to an infusion device for performing an infusion at a minimal flow rate used by an analysis device such as a liquid chromatography, etc. More particularly, the present invention relates to a check valve for preventing a reverse flow of a liquid.

2. Description of Related Art

In the liquid chromatography, a pressurized, accurate, and stable flow rate is required to transport a liquid as a mobile phase. Thus, a plunger type infusion device is mostly used.

FIG. 4 shows a schematic structure of an ordinary plunger type infusion device by taking an infusion device using a cam as a mechanism for moving a plunger back and forth as an example. In the plunger type infusion device, a cam shaft 22 of a cam 21 is rotated by being connected with a rotary shaft of a motor (not shown). A cam follower 23 is externally connected to the cam 21 and rotated along with the rotation of the cam 21. The cam follower 23 and a sliding follower shaft 24 are securely installed with a cylindrical crosshead 25. Thus, the rotation of the cam 21 is converted into a linear back-and-forth movement of the crosshead 25. The crosshead 25 normally applies a pressure to the right direction (the side of the cam 21) of the figure by a spring 27, and thus the cam 21 and the cam follower 23 normally remain a fastening state. A cylindrical plunger 28 extends to be installed on a shaft core of the crosshead 25, such that a volume of a working fluid chamber V may be increased or decreased periodically with the back-and-forth movement of the plunger 28. The plunger 28 is embedded in and inserted into an annular sealing ring 29 and then moved back and forth, thereby preventing the working fluid in the working fluid chamber V from leaking towards the crosshead 25.

In order to limit a flow direction of the transported working fluid to a direction only from bottom to top in FIG. 4, check valves 31a and 31b are inserted into an ejection opening and a suction opening of the working fluid chamber V.

When the plunger 28 is moved rightwards, such that the volume of the working fluid chamber V is increased, the working fluid is sucked into the working fluid chamber V through the check valve 31b at the side of the suction opening (at the bottom of the figure). At this time, the check valve 31a is used to prevent the suction of the working fluid which comes from the side of the ejection opening (at the top of the figure). Then, when the plunger 28 is moved leftwards, such that the volume of the working fluid chamber V is decreased, the working fluid is ejected from the working fluid chamber V through the check valve 31a at the ejection side. At this time, the check valve 31b is used to prevent the flow of the working fluid towards the side of the suction opening.

FIG. 4(b) shows a schematic structure of a check valve 31. A sphere 35 is contained in a space surrounded by a casing 32 and a valve seat 30. The sphere 35 moves with the flow of the liquid and is separated from or joined to the valve seat 30 (Patent Document 1, etc.). When the liquid flows in the arrow direction in FIG. 4(b), the sphere 35 is departed from the valve seat 30 to open a flow path. When the liquid tends to flow in an opposite direction to the arrow, the sphere 35 abuts against the valve seat 30 to block the flow path, thereby preventing the liquid from flowing in the opposite direction.

In recent years, in the field of liquid chromatography, there are higher requirements in performing an analysis at a minimal flow rate (tens of nL~several µL/minute), and the infusion precision of the infusion device has become more important. In order to realize the infusion precision at the required flow rate, it is essential to ensure the tightness of the check valve. As described above, the check valve is a valve in which the sphere and the valve seat having the through hole are separated from or joined to each other according to the liquid flow. In order to improve the tightness between the sphere and the valve seat in an abutting state, a check valve being precisely processed and having strictly managed geometric tolerance is used. In FIG. 5, FIG. 5(a) is a sectional view taken along a central line of the valve seat 30 when the valve seat 30 and the sphere 35 are in the abutting state; FIG. 5(b) is an enlarged view of an abutting portion when the sphere 35 and the valve seat 30 are in the abutting state; and FIG. 5(c) is a plan view viewed from one side of the valve seat abutted against the sphere. The valve seat 30 has a through hole 30h penetrating there-through, and the transported liquid passes through the through hole 30h. The abutting portion of the valve seat 30 against the sphere 35 is processed to form a concave spherical surface having the same diameter as a diameter Φb of the sphere 35. Accordingly, when the flow path is blocked, the valve seat 30 in a shape of a circular ring having a width W contacts the sphere 35. The tightness is improved by performing a mirror surface processing on this contact surface S0.

Related Patent

[Patent Document 1] Japanese Patent Laid-open Publication No. 7-145871
[Patent Document 2] U.S. Pat. No. 4,862,907

As far as the check valve is concerned, it is important to improve the tightness while preventing the flow in the opposite direction and to smooth the flow in the forward direction. The so-called "sinking phenomenon", in which the sphere is unable to break away from the valve seat at the appropriate moment, is the reason in which the flow in the forward direction is being hindered. The sinking phenomenon can easily occur in the situation that the contact area between the sphere and the valve seat is large, the contact surface is smooth, and the surface pressure is large. However, when the sinking phenomenon occurs, the infusion precision is significantly reduced and the infusion cannot be performed at the set flow-rate. Consequently, a normal analysis result cannot be obtained when performing the liquid chromatography. The present inventor apprehends, according to experiences, that especially when an infusion device having a check valve, in which that valve seat has been mirror-surface processed, is used to transport acetonitrile, the phenomenon that the check valve at the suction side sunk towards the working fluid chamber often occurs.

SUMMARY OF THE INVENTION

Accordingly, the present invention is directed to a check valve capable of maintaining a highly tight concealment between a sphere and a valve seat while maintaining a small contact area between a sphere and a valve seat.

The present invention provides a check valve including a sphere and a valve seat having a through hole penetrating there-through. The check valve is characterized in that, the valve seat has a first concave spherical surface at one side abutted against the sphere and a second concave spherical surface inside the first concave spherical surface, and an opening of the through hole is disposed inside the second concave spherical surface. According to one embodiment, a relation between a diameter Φ1 of the first concave spherical surface, a diameter Φ2 of the second concave spherical surface, and a diameter ΦB of the sphere is expressed by Φ1>ΦB>Φ2.

The following structure is formed by disposing the second concave spherical surface inside the first concave spherical surface. That is, an annular rim is formed at a boundary portion between the first concave spherical surface and the second concave spherical surface, and the annular rim abuts against the sphere.

In addition, the check valve is manufactured by the following processes. That is, a member used as a valve seat is prepared, a through hole penetrates through the member, a first concave spherical surface of a diameter Φ1 is carved in a portion of the through hole of the valve seat, and a second concave spherical surface of a diameter Φ2 is carved inside the carved first concave spherical surface.

In the manufacturing processes, a bearing steel ball of the diameter Φ1 is used in carving the first concave spherical surface, and a bearing steel ball of the diameter Φ2 is used in carving the second concave spherical surface.

The spherical surfaces being perfectly spherical may be realized by using the bearing steel balls in carving the concave spherical surfaces, and thus a roundness of the rim of the second concave spherical surface formed inside the first concave spherical surface may be enhanced.

Or, in the check valve including the sphere and the valve seat having the through hole penetrating there-through, the valve seat has a first conical surface located at one side abutted against the sphere, and a second conical surface with a circle, formed by connecting points of tangency between the sphere and the first conical surface, as a bottom surface.

Effect of Invention

The area of the abutting portion becomes very small, and thus the contact area is reduced, thereby suppressing the occurrence of the sinking phenomenon. Then, the tightness may be improved by contacting the sphere which being perfectly spherical with the annular rim which is fully round. If the check valve is used in an infusion device, a stable infusion device in which sinking is hardly generated may be provided. If the infusion device in the present invention is a liquid chromatography infusion device, the problem of poor infusion in liquid chromatography may be suppressed even in a continuous analysis operation of many samples.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
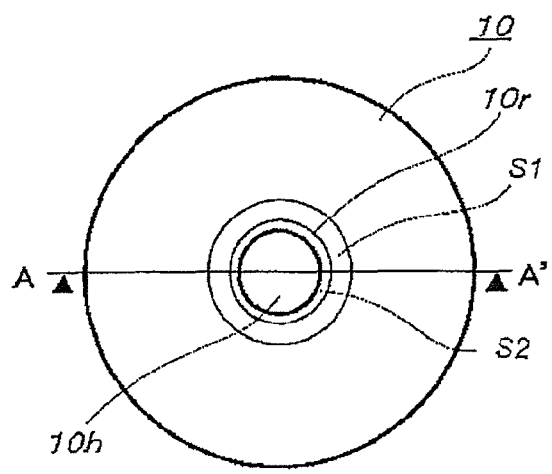
FIGS. 1(a), (b), (c) show an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The check valve in the present invention is illustrated with reference to the figures.

FIG. 1 is a view illustrating an important part of the check valve in the present invention. FIG. 1(a) is a plan view of a valve seat 10 viewed from one side abutted against a sphere. A through hole 10h, for transporting liquid, penetrates through the valve seat 10. At an opening at one side, abutted against the sphere, of the through hole 10h, a concave spherical surface S2 is formed by the way of forming an opening, and then, a concave spherical surface S1 is formed in a manner of forming the concave spherical surface S2. Since the concave spherical surface S2 is formed inside the concave spherical surface S1, an annular rim 10r is formed at a boundary between the concave spherical surface S1 and the concave spherical surface S2 due to the difference in diameters of the concave spherical surfaces.

Figure 1B:
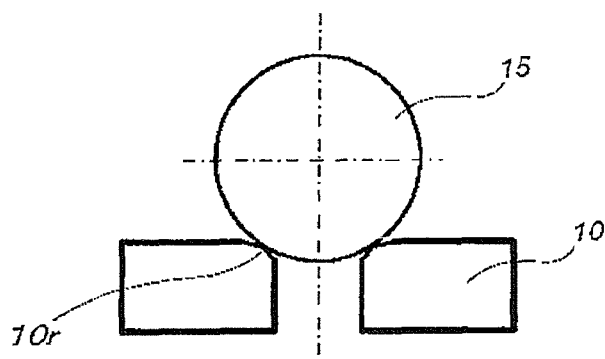
Figure 1C:
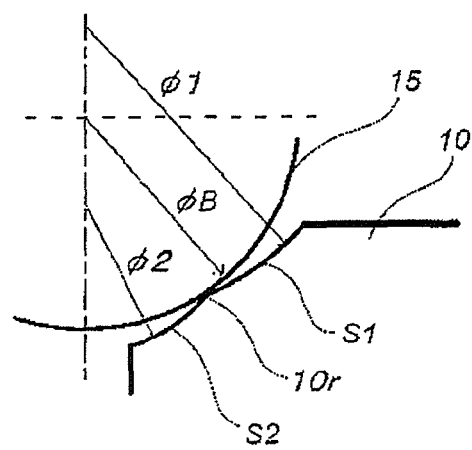

FIG. 1(b) is a view illustrating a section taken along A-A' in the valve seat 10 and a state in which the valve seat 10 abuts against the sphere 15. In the check valve in the present invention, the annular rim 10r of the valve seat 10 abuts against the sphere 15, so as to prevent a reverse flow of the liquid. FIG. 1(c) is an enlarged view of an abutting portion of the sphere 15 against the valve seat 10. A size relation among a diameter Φ1 of the concave spherical surface S1, a diameter Φ2 of the concave spherical surface S2, a diameter Φh of the through hole h, and a diameter ΦB of the sphere 15 is Φ1>ΦB>Φ2>Φh. According to this relation, only the annular rim 10r contacts the sphere 15, and thus a contact area becomes very small.

A roundness of a circle of the rim 10r, i.e., the boundary between the concave spherical surface S1 and the concave spherical surface S2, depends on the sphericity of the concave spherical surface S1 and the concave spherical surface S2. Therefore, the higher processing precision of the concave spherical surface S1 and the concave spherical surface S2 may result in with the rim 10r that is fully round. At a front end of the rim, the rim 10r that is fully round is in a line contact with the sphere 15 of a perfect sphericity.

Figure 2:
FIGS. 2(a)~(f) are views illustrating a fabrication sequence of a valve seat of a check valve in the present invention.
Figure 2:
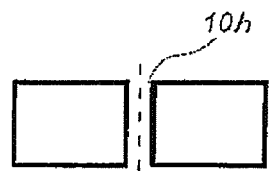
Figure 2:
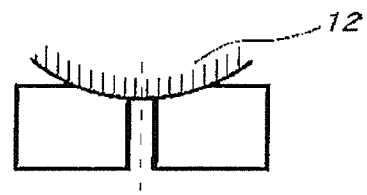
Figure 2:
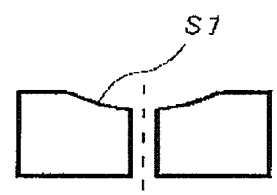
Figure 2:
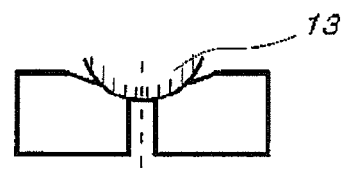
Figure 2:
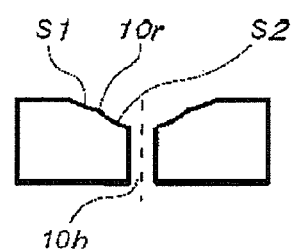

When processing the concave spherical surfaces, bearing steel balls are used in order to obtain a high processing precision. As far as the bearing steel balls are concerned, steel balls having suitable sizes and a high degree of sphericity can be selected depending upon the purposes in accordance to the provisions of the Specification (JIS B 1501, ISO 3290). For example, mostly the check valve in which the Φh of the through hole of the valve seat (for example, made of sapphire, diameter Φ of 3 mm×thickness of 1 mm) is 1 mm and the diameter ΦB of the sphere (for example, made of ruby) is 1.5 mm is popular in the field of liquid chromatography. The steel balls of Φ1 and Φ2 satisfying Φ1>ΦB (1.5 mm)>Φ2>Φh (1.0 mm) can also be selected in combination with these dimensions. Referring to FIG. 2, a manufacturing method of the valve seat 10 is illustrated by taking the situation that ΦB is 1.5 mm and Φh is 1.0 mm as an example.

A disk-like substrate used as the valve seat 10 is prepared (FIG. 2(a)). The through hole h having a diameter of 1.0 mm is disposed through the disk in a thickness direction thereof by well-known mechanical process (FIG. 2(b)).

A mechanical process such as rotation is performed in a state in which the bearing steel ball of a diameter Φ1 abuts against the opening of the through hole h of the substrate 11 (FIG. 2(c)). The upper limit of Φ1 is not specified as long as Φ1 is greater than ΦB (1.5 mm). However, when the concave spherical surface S1 is carved to a depth that it is possible for the carving of the concave spherical surface S2 described below, and a planar surface is considered of being reserved at an outer periphery of the substrate 11 for affixing a casing thereon, the diameter Φ1 of the bearing steel ball for processing is 2.0~5.0 mm. In JIS specification, in the range of 2.0-5.0 mm, steel balls of different sizes are specified by a numerical range of 0.5 mm; and thus, a high degree of sphericity is easily obtained. The S1 may also be used as a plane; and thus, the diameter Φ1 is considered infinitely large.

The concave spherical surface of the Φ1 is carved at the opening of the substrate 11 by the above-mentioned processing (FIG. 2(d)).

Next, the mechanical processing is performed by using the spherical surface of a bearing steel ball with a diameter Φ2 to carve the concave spherical surface S1 at the opening of the through hole h of the substrate 11 (FIG. 2(e)).

The concave spherical surface of the Φ2 is carved at the opening of the substrate 11 via a process of using the bearing steel ball of the diameter Φ2. Since the inner diameters of the S1 and the S2 at the boundary portion are different, the rim 10r is formed fully round at the boundary between the S1 and the S2 (FIG. 2(f)).

The valve seat fabricated by the process in FIGS. 2(a) to 2(f) and the sphere of the diameter ΦB (in which Φ1>ΦB>Φ2) can be assembled to form the check valve.

As described above, the check valve having a small contact area and a highly tight concealment between the sphere and the valve seat can be realized in the present invention.

When a conventional check valve is used, and a check valve of an infusion device in which "a sinking phenomenon occurs to about 50% of devices after 100% acetonitrile is transported under conditions of a flow rate of 1.5 mL/minute and a pressure of about 35 MPa for 500 hours" is replaced by the check valve of the present invention and the occurrence frequency of the sinking phenomenon is evaluated, it is determined that no sinking phenomenon occurs in the infusion under the condition "100% acetonitrile is transported under conditions of a flow rate of 1.5 mL/minute and a pressure of about 35 MPa for 500 hours", and the normal infusion is continuously performed. Then, it is also being determined that no sinking phenomenon occurs even in the infusion under extreme conditions of "100% acetonitrile is transported under conditions of a flow rate of 3.0 mL/minute and a pressure of about 60 MPa for 600 hours".

According to the present invention, the check valve in which the contact area between the sphere and the valve seat has been reduced can be realized, which plays a significant role in the infusion device using the check valve. In the illustration of the present invention in detail, for the sake of simplicity, a central line of the valve seat is consistent with a central line of the through hole of the sheet, and centres of two concave spherical surfaces are drawn in the central line. Although it is preferred that the centres of the two concave spherical surfaces be consistent with the central line, the present invention is limited as such.

According to the technical ideas of the present invention, it is clear that, the check valve in which the sphere and the valve seat are in a line contact can be realized even if the two concave spherical surfaces are replaced by two conical surfaces or a combination of a spherical surface and a conical surface. Another embodiment is disclosed below.

Figure 3:
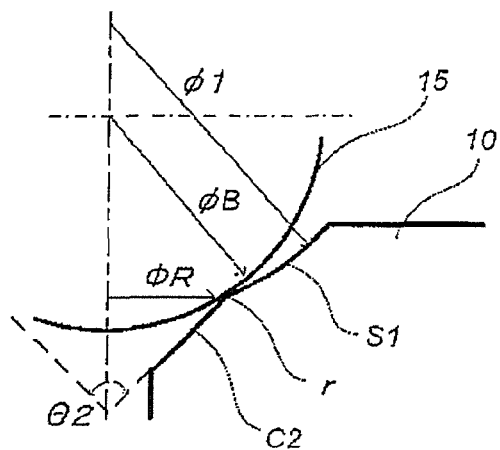
FIGS. 3(a), (b), (c) show another embodiment of the present invention.
Figure 3:
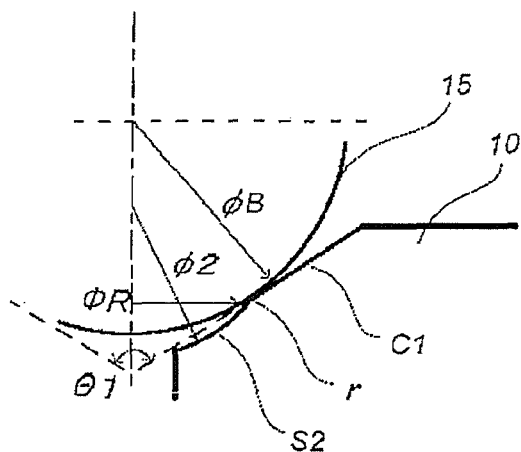
Figure 3:
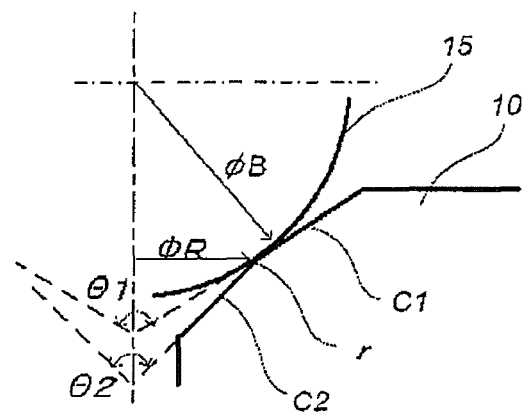
Figure 4:
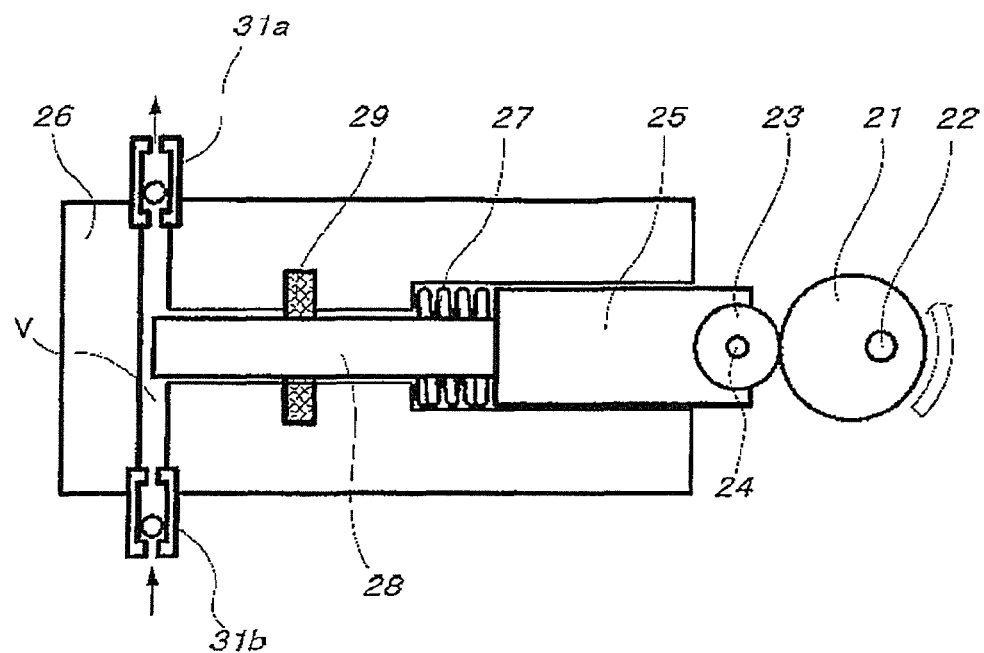
FIGS. 4(a), (b) are structural views of an ordinary infusion device.
Figure 4:
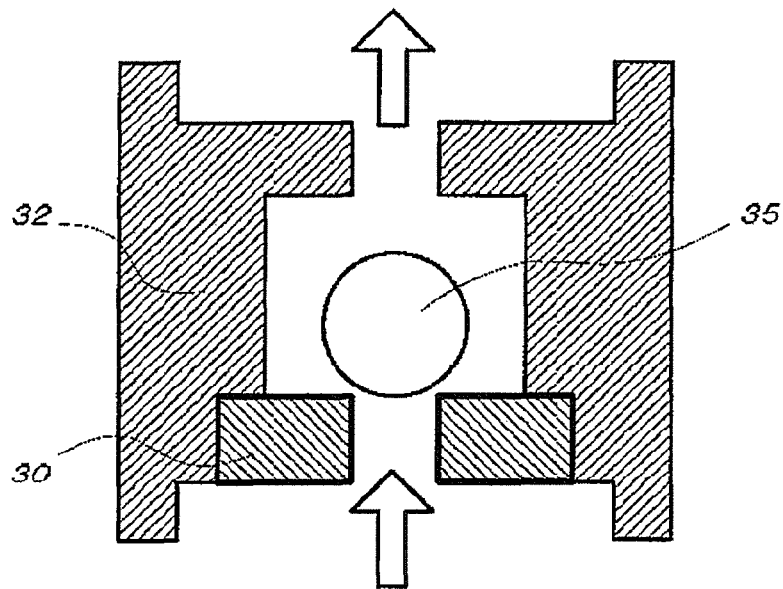
Figure 5A:
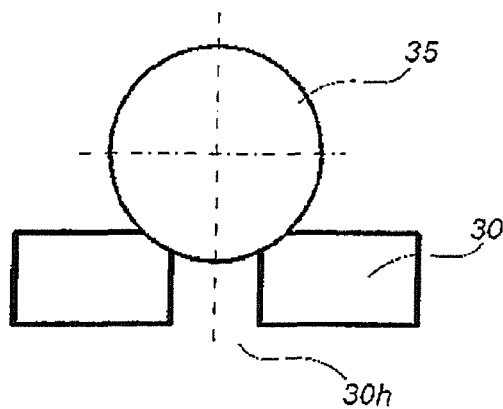
FIGS. 5(a), (b), (c) are structural views of an infusion device according to the prior art.
Figure 5:
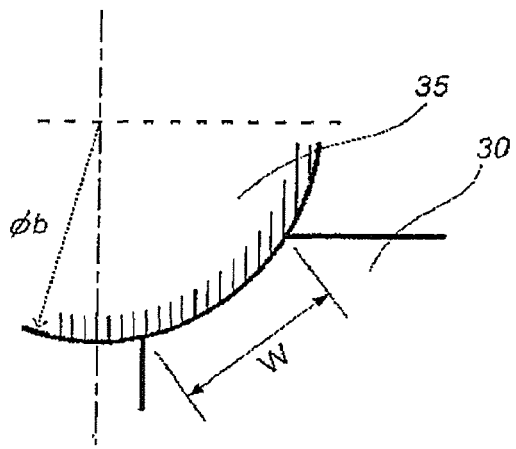
Figure 5:
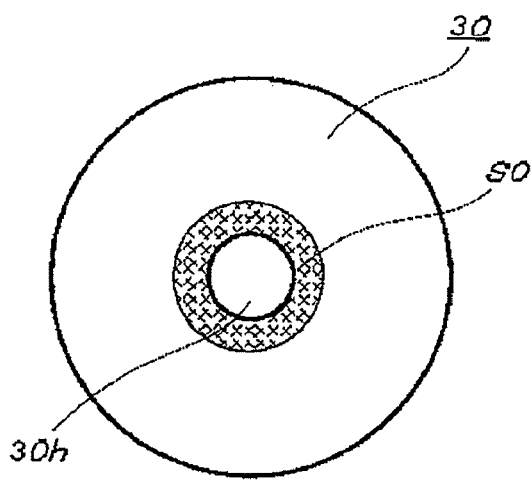

FIG. 3(a) shows an example in which a conical surface C2 is formed inside a spherical surface having a diameter (Φ1) greater than that of the sphere to replace the second concave spherical surface. Assume that the first concave spherical surface abuts against the sphere 15, a process is performed in such a way that a circle of the diameter (ΦR) formed by a collection of points of tangency between the concave spherical surface S2 and the sphere 15 serves as a bottom surface of the conical surface, thereby providing the line contact between the valve seat 10 and the sphere 15. A vertex angle θ2 of the conical surface C2 being an acute angle facilitates the formation of the annular rim r, but the vertex angle θ2 may be approximately a right angle.

FIG. 3(b) shows an example in which a conical surface C1 having a larger vertex angle θ1 (preferably 90° or more than 90°) is formed to replace the first concave spherical surface and a spherical surface equivalent to the second concave spherical surface is formed inside the conical surface C1. Assuming that the conical surface C1 abuts against the sphere (ΦB), the line contact between the valve seat 10 and the sphere 15 can be realized by making a diameter (Φ2) of the concave spherical surface S2 equivalent to the second concave spherical surface greater than a diameter (ΦR) of a circle formed by a collection of points of tangency between the conical surface C1 and the sphere and smaller than the diameter (ΦB) of the sphere 15. In addition, when the vertex angle θ1 of the conical surface is 180°, the conical surface becomes a plane identical to the situation that the Φ1 is infinitely large in the above example.

FIG. 3(c) shows an example in which a first conical surface C1 is formed to replace the first concave spherical surface and a second conical surface C2 is formed inside the first conical surface C1 to replace the second concave spherical surface. By making the vertex angle θ1 of the first conical surface C1 relatively large (preferably 90° or more than 90°), and assuming that the first conical surface C1 abuts against the sphere 15, the second conical surface C2 is processed in such a way that a circle formed by a collection of points of tangency between the conical surface C1 and the sphere 15 serves as a bottom surface. The line contact between the valve seat 10 and the sphere 15 can be realized by making the vertex angle θ2 of the second conical surface C2 smaller than the vertex angle θ1 of the first conical surface C1.

The above embodiment is only an example of the present invention. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A check valve, comprising a sphere and a valve seat with a through hole penetrating there-through, wherein the valve seat has a first concave spherical surface at one side abutted against the sphere, and a second concave spherical surface inside the first concave spherical surface, and an opening of the through hole is disposed inside the second concave spherical surface, wherein, the first concave spherical surface and the second concave spherical surface together form an annular rim, and at a front end of the annular rim, the annular rim that is fully round is in a line contact with the sphere of a perfect sphericity, and a diameter of the first concave spherical surface is different from a diameter of the second first concave spherical surface.

2. The check valve according to claim 1, wherein:

a relation among a diameter $\Phi 1$ of the first concave spherical surface, a diameter $\Phi 2$ of the second concave spherical surface, and a diameter $\Phi B$ of the sphere is $\Phi 1 > \Phi B > \Phi 2$.

3. An infusion device, comprising a check valve according to claim 1;

wherein a cam shaft of a cam is rotated by being connected with a rotary shaft of a motor, a cam follower is externally connected to the cam and rotated along with the rotation of the cam, the cam follower and a sliding follower shaft are securely installed with a cylindrical crosshead, the crosshead normally applies a pressure to the right direction (the side of the cam) by a spring, and thus the cam and the cam follower normally remain a fastening state, a cylindrical plunger extends to be installed on a shaft core of the crosshead, and the plunger is embedded in and inserted into an annular sealing ring.

4. An infusion device, comprising a check valve according to claim 2;

wherein a cam shaft of a cam is rotated by being connected with a rotary shaft of a motor, a cam follower is externally connected to the cam and rotated along with the rotation of the cam, the cam follower and a sliding follower shaft are securely installed with a cylindrical crosshead, the crosshead normally applies a pressure to the right direction (the side of the cam) by a spring, and thus the cam and the cam follower normally remain a fastening state, a cylindrical plunger extends to be installed on a shaft core of the crosshead, and the plunger is embedded in and inserted into an annular sealing ring.

* * * * *